F. G. GRABER.
KITCHEN UTENSIL.
APPLICATION FILED JULY 19, 1921.

1,392,491.

Patented Oct. 4, 1921.
2 SHEETS—SHEET 1.

Inventor
Fred G. Graber
By Trease and Bond
Attorneys

F. G. GRABER.
KITCHEN UTENSIL.
APPLICATION FILED JULY 19, 1921.

1,392,491.

Patented Oct. 4, 1921.
2 SHEETS—SHEET 2.

Inventor
Fred G. Graber
By Frease and Bond
Attorneys

UNITED STATES PATENT OFFICE.

FRED G. GRABER, OF CANTON, OHIO.

KITCHEN UTENSIL.

1,392,491. Specification of Letters Patent. Patented Oct. 4, 1921.

Application filed July 19, 1921. Serial No. 485,892.

*To all whom it may concern:*

Be it known that I, FRED G. GRABER, a citizen of the United States, residing at Canton, in the county of Stark and State of Ohio, have invented a new and useful Kitchen Utensil, of which the following is a specification.

This invention relates to a kitchen utensil, especially adapted for tendering meats and has for its object, to provide a simple, inexpensive and easily operated device adapted to quickly and effectively tender meat without severing the fibers thereof, thus preventing loss of the juicy or nutritious particles of the meat.

Further objects are to provide a device of this character which is so constructed that the operator may place the desired amount of tension upon the operating rolls to properly tender the meat passed therethrough, means being provided for preventing the meat from passing downwardly around the lower roll as it is carried through the device.

With these objects in view the invention consists in the construction and arrangement of parts, hereinafter described, illustrated in the accompanying drawings, it being understood that various changes in the form and details of construction may be made within the scope of the appended claims.

The invention thus set forth in general terms is illustrated in the accompanying drawings forming part hereof, in which—

Figure 1:
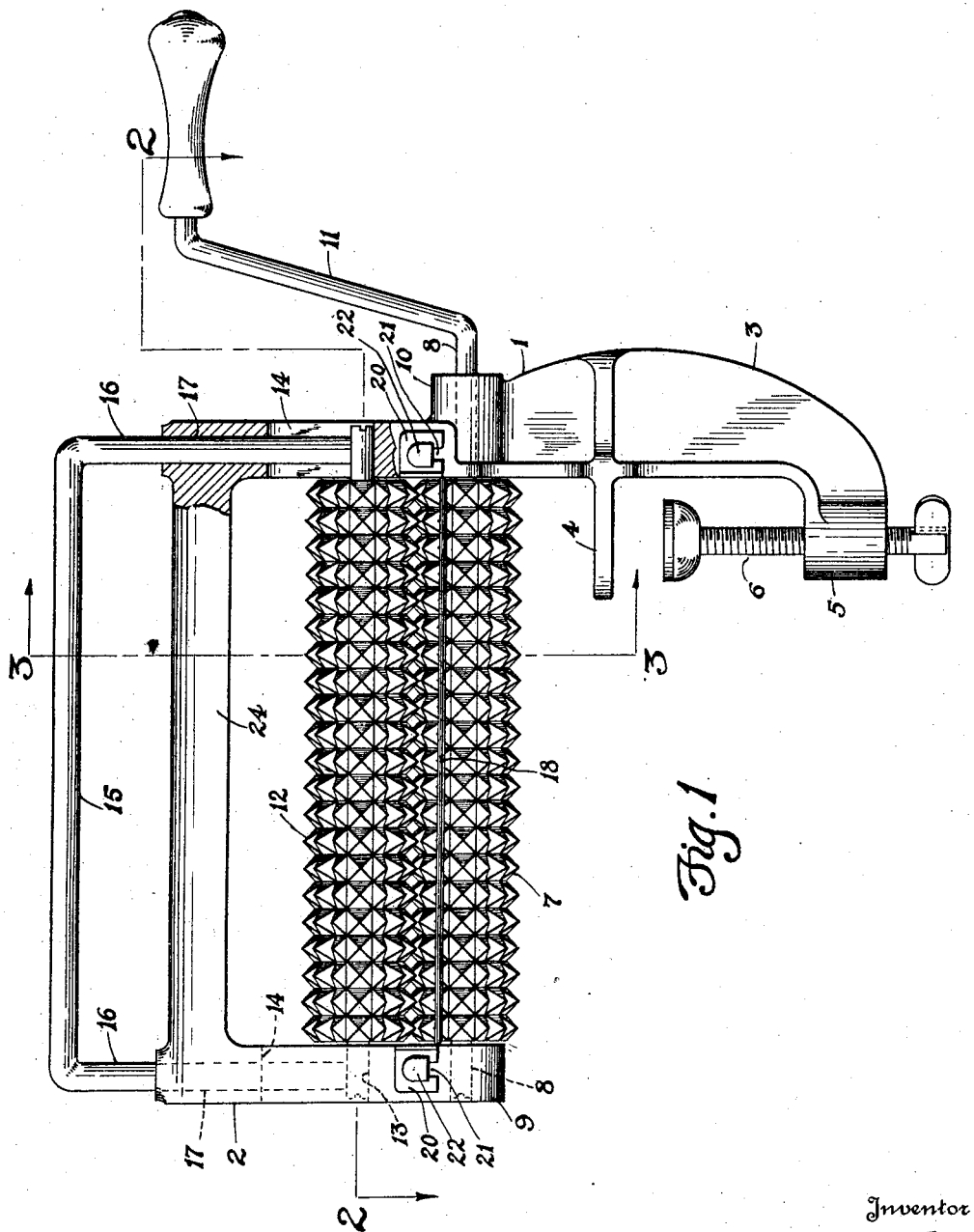
Figure 2:
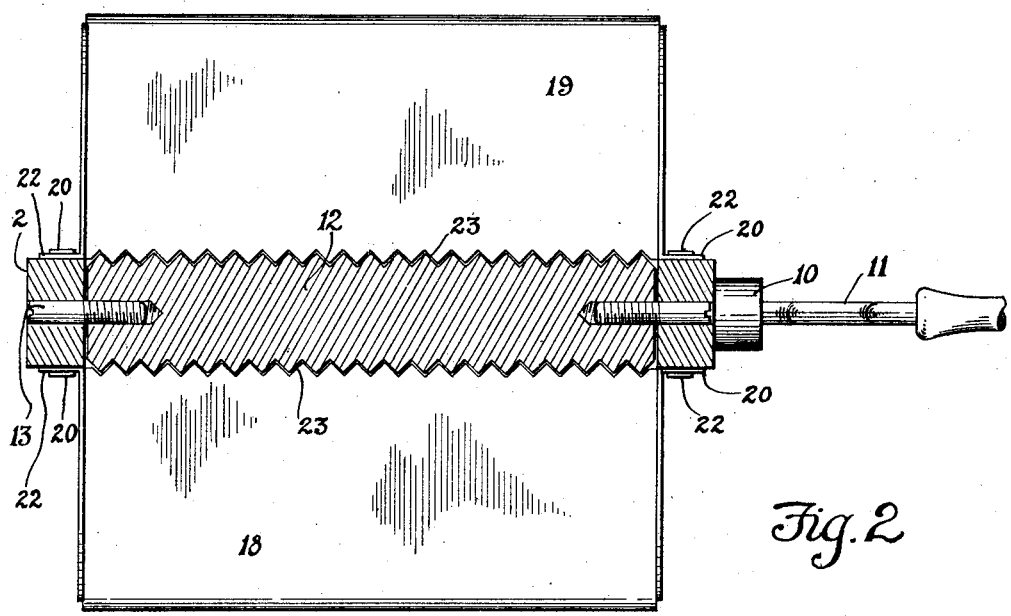

Figure 1 is a side elevation of a meat tenderer embodying the invention, parts being broken away for the purpose of illustration;

Fig. 2, a section on the line 2—2, Fig. 1; and

Figure 3:
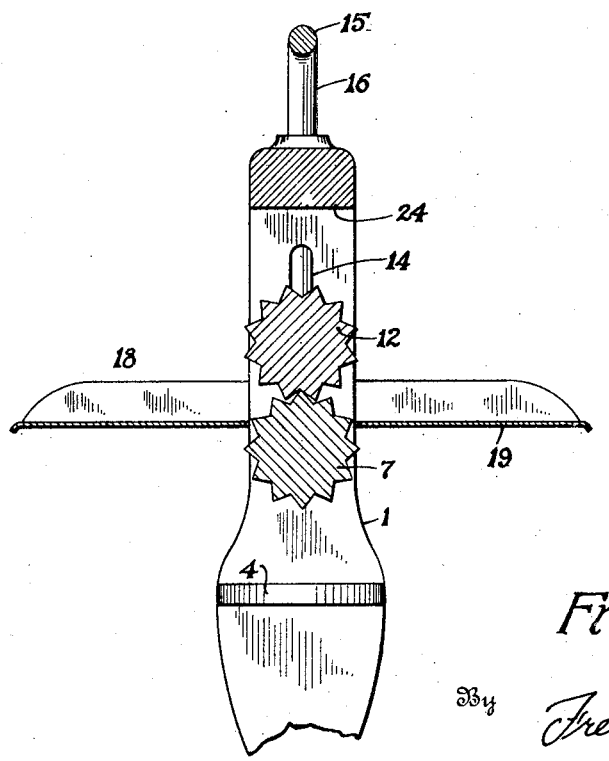

Fig. 3, a section on the line 3—3, Fig. 1.

Similar numerals refer to similar parts through the several figures of the drawings.

The device includes a main frame 1, preferably cast, provided with the upper inverted U-shaped portion 2 and the pendent in-turned bracket portion 3 provided with the inwardly disposed flange 4 arranged to engage the top of a table or the like, a threaded vertical portion 5 being provided with the clamping screw 6 arranged to engage the under surface of the table for clamping the device tightly upon a table edge.

The lower roll 7, which is preferably spiked or serrated, as shown, is provided with a shaft 8 journaled in the bearings 9 and 10 formed at the lower portions of the legs of the inverted U-portion 2, an operating handle 11 being provided thereon for rotating said roll.

The upper roll 12 is preferably of the same contour as the lower roll, the pyramidal spiked teeth thereof being arranged to mesh with the teeth of the lower roll as best shown in Fig. 3. The shaft 13 of the upper roll extends at each end into the vertical slots 14 provided in the legs of the U-portion of the frame, an inverted U-shaped bar 15 being provided, the vertical legs 16 thereof being slidably mounted through the vertical apertures 17, which communicate with the slots 17, the lower ends of said legs engaging the end portions of the shaft 13.

Trays 18 and 19, preferably formed of sheet metal are attached to opposite sides of the frame in a plane beneath the intersection of the upper and lower rollers, each of these trays being provided with the outturned flanges 20 having the open slots 21 therein for engagement with the headed lugs 22 by means of which the trays are mounted upon the main frame. One or both of the trays may be provided with the V-shaped notches 23 which receive the pyramidal teeth of the lower roll allowing the teeth to pass therethrough as the roll is rotated but preventing the meat passing through the device from being caught between the tray and the lower roll.

In operation the meat to be tendered is placed upon one of the trays and the operating handle 11 is turned in the proper direction to carry the meat between the rolls and on to the other tray. The operator operates the lever 21 with one hand and with the other hand grasps the horizontal bar 24 of the U-portion of the bar and the horizontal portion of the U-bar 15 in the other hand, forcing the U-bar 15 downwardly placing the proper tension upon the upper roll 12, causing the meat to be properly tendered as it passes between the rolls.

I claim:—

1. A meat tenderer including an inverted U-shaped frame, means upon the lower end of one leg of said frame for clamping the same to a table, a roll journaled in the lower portions of the legs of said frame, said frame being provided with vertical slots above the journals of said roll, a second roll journaled in said slots and an inverted U-shaped bar, the legs of which are slidably mounted within the legs of the frame and engage the journals of the second named roll, the cross bar of said U-shaped bar being spaced above and parallel with the cross bar of the U-shaped frame in position to permit the operator to grasp both of said cross bars together in one hand to force the second named roll toward the first named roll, and means for rotating the first named roll.

2. A meat tenderer, including an inverted U-shaped frame, a roll journaled in the lower portion thereof, said frame being provided with vertical slots, a second roll journaled in said slots and an inverted U-shaped bar slidably mounted in the frame and engaging the journal portions of the second named roll, said U-shaped bar positioned to permit the operator to grasp the same together with the U-shaped frame to force the second named roll against the first named roll.

In testimony that I claim the above, I have hereunto subscribed my name.

FRED G. GRABER.